UNITED STATES PATENT OFFICE.

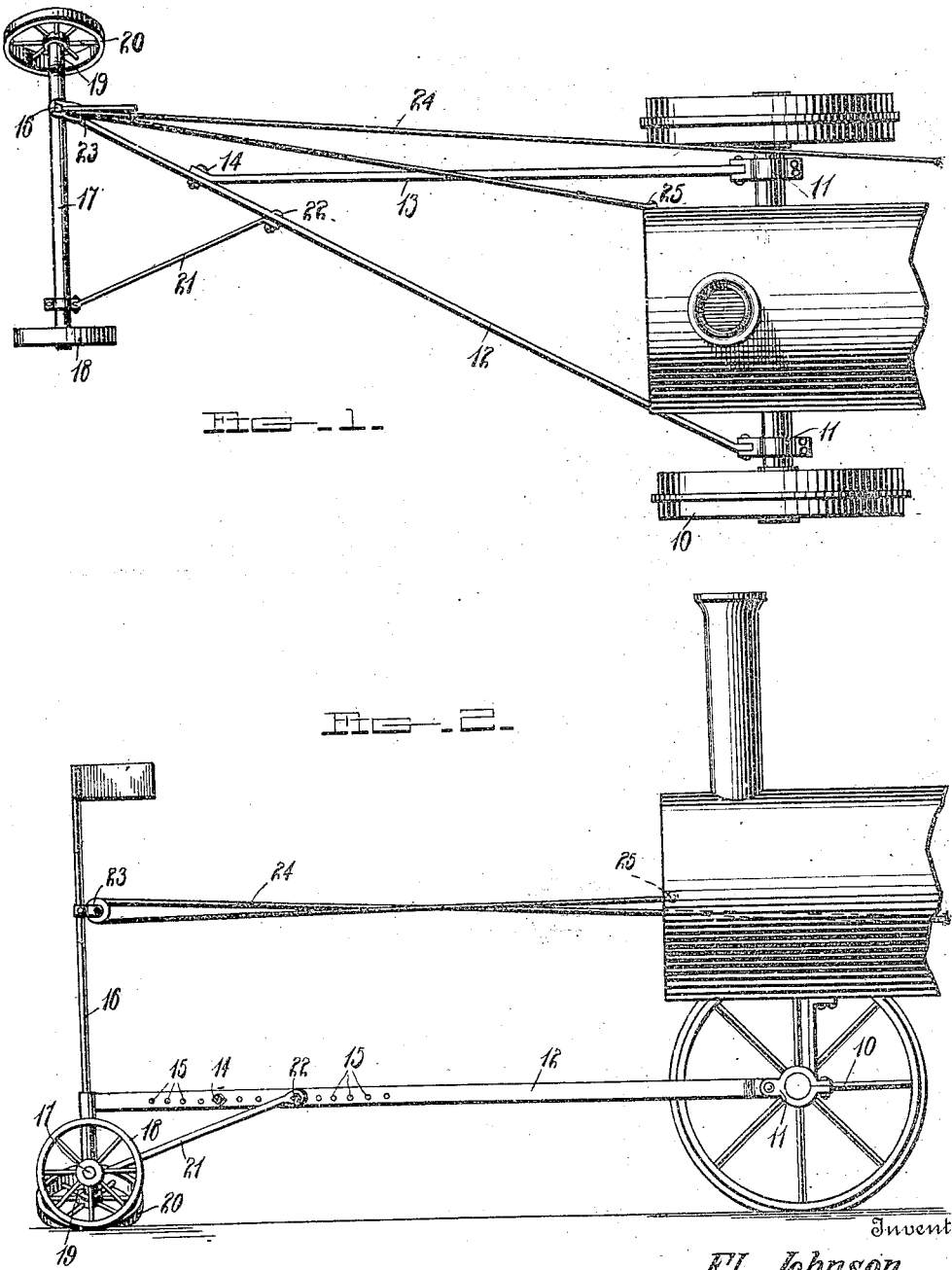

FREDERICK L. JOHNSON, OF LAKOTA, NORTH DAKOTA.

SELF-STEERING DEVICE.

1,057,841.   Specification of Letters Patent.   Patented Apr. 1, 1913.

Application filed January 4, 1912. Serial No. 669,442.

*To all whom it may concern:*

Be it known that I, FREDERICK L. JOHNSON, a citizen of the United States, residing at Lakota, in the county of Nelson, State of North Dakota, have invented certain new and useful Improvements in Self-Steering Devices; and I do hereby declare the following to be a full, clear, and exact description of the invention, such as will enable others skilled in the art to which it appertains to make and use the same.

My invention relates to new and useful improvements in furrow-pilots adapted to be attached to the swiveled steering truck of a traction engine, when said engine is to be employed for plowing, and the object of my invention is to improve the construction and increase the efficiency of devices of the above described character.

A further object of my invention is the provision of a novel form of supporting frame by means of which a pilot wheel is connected to the truck. And a still further object of my invention is to provide a frame which may be readily adjusted for use upon different engines or upon the same engine with different plows.

With the above and other objects in view, my invention will be more fully described, illustrated in the accompanying drawings which show a preferred embodiment of my device and then specifically pointed out in the claim which is attached to and forms a part of this application.

In the drawings, Figure 1 is a top plan of my improved device in operation. Fig. 2 is a side elevation.

Referring more specifically to the drawings, in which similar reference numerals designate corresponding parts throughout, 10 designates in general the swiveled forward truck of a conventional form of traction engine which truck is provided adjacent each end with a pair of forwardly directed, spaced apart ears 11. Pivoted for vertical swinging between one pair of said ears is the rear end of a frame member 12 and correspondingly pivoted between the other pair of ears is a second frame member 13 the forward end of which is adjustably secured to the member 12 intermediate the length of the latter, by a bolt 14 adapted to pass through one of a plurality of bores 15 formed in the member 12. The forward end of the frame member 12 is rigidly secured to a vertical standard 16 the lower end of which is rigidly secured to an axle 17 upon one end of which is rotatably mounted a bearing wheel 18. The other end of this axle 17 is bent downwardly as shown at 19 and rotatably mounted upon this downwardly bent portion is the pilot wheel 20 adapted to run in the furrow as shown. Pivotally secured to the axle 17 adjacent that end which bears the wheel 18 is the forward end of a brace rod 21 the rear end of which is adjustably secured to the frame member 12 by a bolt 22 which passes through one of the bores 15 of the frame member. By means of the adjustment thus furnished between the frame member 12 and the frame member 13 and brace 21 the device may be readily attached to various forms of traction engines and may also be adjusted to give various off-sets to the pilot wheel 20, while at the same time the axle 17 is constantly maintained at right angles to the line of travel.

The standard 16 is provided at a point above its connection with the frame member 12 with a pulley 23 over which is passed a cable 24 one end of which is secured to the body of the traction engine as at 25 while the opposite end runs rearwardly to a point within easy reach of the operator. As will be readily seen by means of this cable the entire device may be swung upwardly upon the truck 10 as a pivot, thus raising the pilot wheel out of the furrow when the engine is to be turned.

From the foregoing description it will be apparent that I have provided an extremely simple supporting frame, and one which, because of its adjustability, may be readily applied to traction engines of various types.

It will of course be understood that minor changes in the details of construction may be made if desired without in the slightest degree departing from the spirit of my invention.

What I claim is:—

The combination with a front turning vehicle axle and bracket members secured near the ends of the axle; of a rod having one end secured in one bracket and extending at right angles to the axle, a second rod secured by one end in the other bracket and crossing the path of the first rod, said second rod having a plurality of spaced openings near its forward end, means passed through the forward end of the first rod and through one of the openings in the second rod to adjustably connect the forward ends of said rods, an axle having a bent end with a pilot wheel secured thereto, and a bearing wheel upon the other end of the axle, a standard projecting upwardly from the axle near the first mentioned end and secured to the forward extremity of the second rod, and a brace rod secured by one end to the second mentioned end of the second axle and adjustably connected by its opposite end to the second rod.

In testimony whereof, I affix my signature, in presence of two witnesses.

FREDERICK L. JOHNSON.

Witnesses:
 GEORGE D. KELLEY,
 HILDA JOHNSON.